(12) United States Patent
Liu et al.

(10) Patent No.: US 8,214,781 B1
(45) Date of Patent: Jul. 3, 2012

(54) EMPIRICAL PREDICTION OF SIMULTANEOUS SWITCHING NOISE

(75) Inventors: Zhuyuan Liu, San Jose, CA (US); Geping Liu, San Jose, CA (US); San Wong, Cupertino, CA (US)

(73) Assignee: Altera Corporation, San Jose, CA (US)

( * ) Notice: Subject to any disclaimer, the term of this patent is extended or adjusted under 35 U.S.C. 154(b) by 904 days.

(21) Appl. No.: 12/208,190

(22) Filed: Sep. 10, 2008

(51) Int. Cl.
*G06F 17/50* (2006.01)
(52) U.S. Cl. .................. 716/106; 716/108; 716/109
(58) Field of Classification Search .......... 716/106–109, 716/132–134
See application file for complete search history.

(56) References Cited

U.S. PATENT DOCUMENTS

| | | | |
|---|---|---|---|
| 6,102,960 | A | 8/2000 | Berman et al. |
| 6,868,374 | B1 | 3/2005 | Ditlow et al. |
| 8,001,508 | B1 * | 8/2011 | Daud et al. ............. 716/115 |

OTHER PUBLICATIONS

Chun et al., "Model to Hardware Correlation for Power Distribution Induced I/O Noise in a Functioning Computer System," 2002 Electronic Components and Technology Conference, pp. 319-324.
Liu et al., "Analyzing FPGA Simultaneous Switching Noise in Printed Circuit Boards," 2006 IEEE, pp. 377-382.
Shi et al., "Simultaneous Switching Noise in FPGA and Structure ASIC Devices, Methodologies for Analysis, Modeling, and Validation," 2006 Electronic Components and Technology Conference, pp. 229-236.
Secker et al., "Effects and Modeling of Simultaneous Switching Noise for BiCMOS Off-Chip Drivers," IEEE Trans. on Components, Packaging, and Manufacturing Technology—Part B, vol. 19, No. 3, Aug. 1996, pp. 473-480.
Suresh et al., "Package-silicon co-design—Experiment with an SOC Design," Proc. of the 17th Int'l Conference on VLSI Design (VLSI '04), 2004 IEEE, 6 pages.

* cited by examiner

*Primary Examiner* — Paul Dinh
(74) *Attorney, Agent, or Firm* — Womble Carlyle Sandridge & Rice LLP

(57) ABSTRACT

In an example embodiment, the system obtains the mutual inductance (e.g., $M_{ij}$) between a quiet I/O buffer and each switching I/O buffer on a PLD from an automatic SSN measurement system. The system calculates the corrected mutual inductance between the quiet I/O buffer and each switching I/O buffer by multiplying the mutual inductance by a correction factor (e.g., $\alpha_j$). The system multiplies each corrected mutual inductance by the rate of current flowing through the switching I/O buffer to obtain an induced voltage resulting from the switching I/O buffer. The system sums the induced voltages for all the switching I/O buffers on the PLD to obtain an estimate of total induced voltage caused in the quiet I/O buffer by all switching I/O buffers. The correction factor is based on bench measurements and depends on the amplitude of the simultaneous switching noise affecting each switching I/O buffer.

18 Claims, 11 Drawing Sheets

$$V_i = \sum_{j=1}^{N} M_{ij} \frac{dI_j}{dt}. \qquad (2)$$

$$V_i = \sum_{j=1}^{N} M_{ij} \alpha_j \frac{dI_j}{dt}$$

vector of         matrix of mutual        vector of
victim pins       inductive coupling      aggressor pins $$\begin{pmatrix} V_1 \\ \\ \\ \cdots \\ \\ \\ V_N \end{pmatrix} = \begin{pmatrix} & & & & & & & \\ & & & V_{ij} & & & & \\ & & & & & & & \end{pmatrix} \begin{pmatrix} 0 \\ 1 \\ 1 \\ \cdots \\ 1 \\ 0 \\ 0 \\ 1 \end{pmatrix}$$

N × 1             N × N                   N × 1

701, 702, 703, 704 mutual inductive coupling    corrected
victim vector     matrix                       aggressor vector $$\begin{pmatrix} V_1 \\ \\ \\ \cdots \\ \\ \\ V_N \end{pmatrix} = \begin{pmatrix} & & & & & & & \\ & & & V_{ij} & & & & \\ & & & & & & & \end{pmatrix} \begin{pmatrix} 0 \\ s_2 \\ s_3 \\ \cdots \\ \cdots \\ 0 \\ 0 \\ s_N \end{pmatrix}$$

EMPIRICAL PREDICTION OF SIMULTANEOUS SWITCHING NOISE

RELATED APPLICATIONS

This is application is related to U.S. patent application Ser. No. 11/877,072, filed on Oct. 23, 2007, entitled "Method and System for Analyzing Input/Output Simultaneous Switching Noise," whose disclosure is incorporated herein by reference.

BACKGROUND

As a result of progress in current CMOS (complementary metal oxide semiconductor) technology, such as advances in 65-nm and 45-nm processes, in a programmable logic device (PLD), such as a field programmable gate arrays (FPGAs), have increased logic elements and I/O buffer (or pin) densities. Because simultaneous switching noise (SSN) is associated with the number of toggling I/O buffers, signal voltage level, and the switching rate of I/O buffers, it is important for FPGA users to be able to evaluate SSN performance in a "chip-package-board" environment. The SSN caused by FPGA output buffers is widely known as simultaneous switching output (SSO) noise and can be differentiated from the SSN caused by input buffers.

SSN in an FPGA system may be attributed to two primary factors: the mutual inductive coupling among switching I/O buffers and the impedance profile of a power distribution network (PDN) including die, package, and printed circuit board (PCB). In essence, reducing SSN is a design-cost issue. While designers can minimize the mutual inductive coupling by increasing the ratio of FPGA ground pins (or return-current pins) to I/O buffers, this approach sacrifices I/O buffer densities. Engineers can improve PDN performance by increasing on-die capacitance and adding on-package decoupling capacitors, but this approach increases costs.

Because FPGAs are programmable, they fit into a wide variety of user applications, so it is useful for designers to have a tool to determine their own SSN budget without additional costs. Ideally, this kind of tool requires instantaneous and accurate result predictions for various FPGA I/O buffer assignments and ideally would provide an optimum buffer assignment under certain design constraints. In the past, designers have constructed system-level, "SPICE-like" models to anticipate SSN in FPGA systems. These models are based on an understanding of SSN cause mechanisms and correlate well with bench measurements, helping IC and packaging designers improve designs.

However, these models are so complicated that they require signal/power integrity expertise to perform time-consuming, system-level simulations. It is cumbersome for all FPGA designers to perform the same level SSN analysis without considering their different design margins. Therefore, there is a need for a tool to help FPGA users execute a comprehensive FPGA SSN analysis in a short design cycle, though the invention claimed below has applicability to other applications beyond this particular application, as will become apparent from the following description and the drawings which accompany it.

SUMMARY

In an example embodiment, the system obtains the mutual inductance (e.g., $M_{ij}$) between a quiet output buffer (e.g., quiet output buffer i) and each switching output buffer (e.g., switching output buffer j) on an FPGA or other programmable logic device (PLD) from an automatic SSN measurement system. The system calculates the corrected mutual inductance between the quiet output buffer and each switching output buffer by multiplying the mutual inductance (e.g., $M_{ij}$) by a normalized correction factor (e.g., $\alpha_j$). The system multiplies each corrected mutual inductance by the rate of current flowing through the switching output buffer to obtain an induced voltage resulting from the switching output buffer. The system then sums the induced voltages for all the switching output buffers on the PLD to obtain an estimate of total induced voltage (e.g., SSO noise) caused in the quiet output buffer by all switching output buffers. In the example embodiment, the normalized correction factor (e.g., $\alpha_j$) is based on bench measurements and depends on the amplitude of the simultaneous switching noise affecting the corresponding switching output buffer (e.g., switching output buffer j).

In an alternative example embodiment, the normalized correction factor is also based on bench measurements. However, in the alternative example embodiment, the normalized correction factor (e.g., $\alpha_j$) depends upon the group number of a switching output buffer (e.g., switching output buffer j) and the number of switching output buffers in the group. In turn, the group number depends upon a threshold induced voltage (e.g., Vij).

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

FIG. 7 is a diagram showing a matrix product for estimating mutual inductive coupling before and after addition of a normalized correction factor, in accordance with an example embodiment.

DETAILED DESCRIPTION

In the following description, numerous specific details are set forth in order to provide a thorough understanding of the exemplary embodiments. However, it will be apparent to one skilled in the art that the exemplary embodiments may be practiced without some of these specific details. In other instances, process operations and implementation details have not been described in detail, if already well known.

Figure 1:
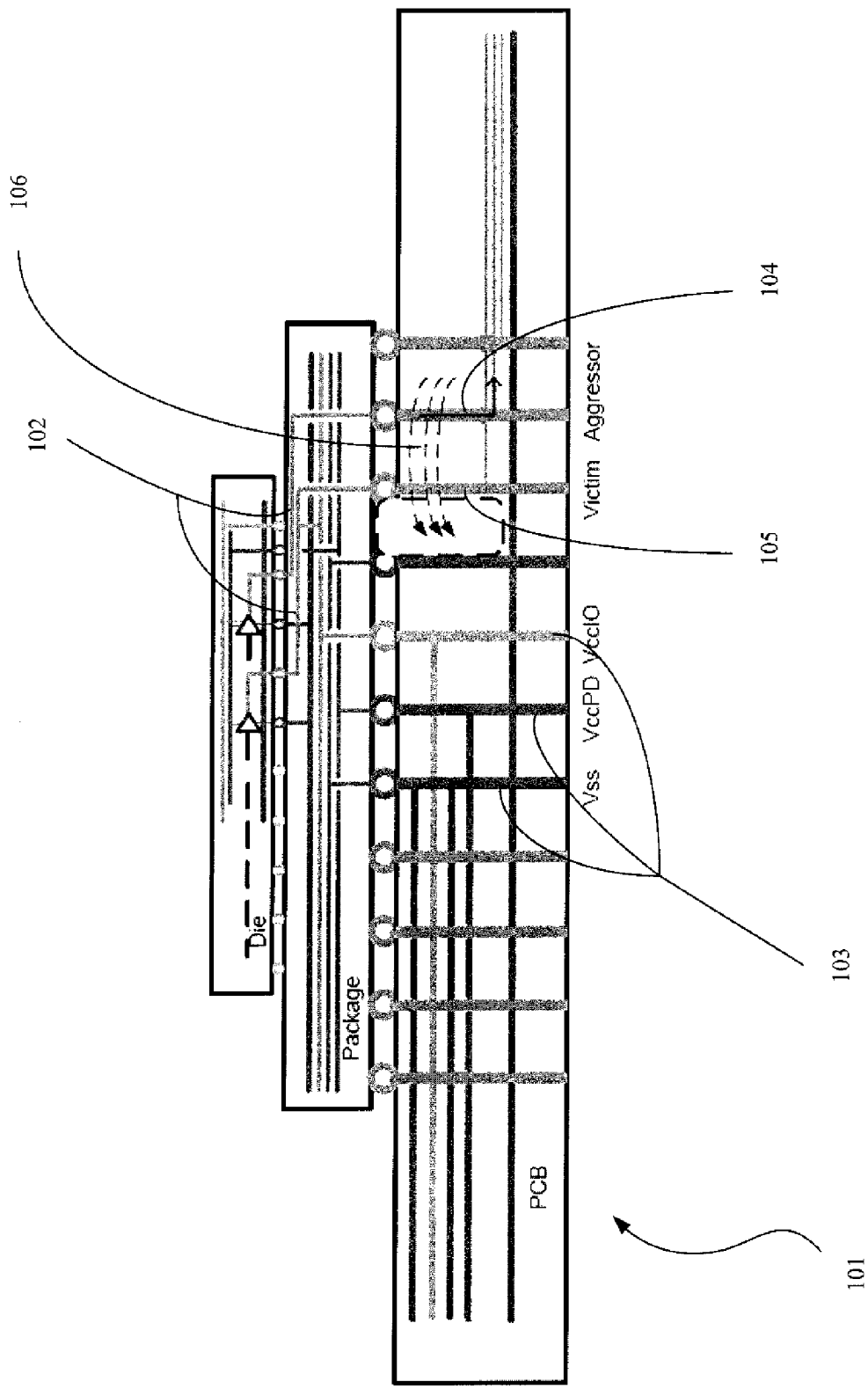
FIG. 1 is a simplified schematic diagram illustrating mutual inductive coupling, in accordance with an example embodiment.

FIG. 1 is a simplified schematic diagram illustrating mutual inductive coupling, in accordance with an example embodiment. FIG. 1 shows an integrated circuit (e.g., a die or chip) connected to a flip-chip package which is connected to a PCB (printed circuit board), e.g., a chip-package-PCB 101. FIG. 1 includes I/O signals 102 which travel through package transmission lines, package vias, solder balls, and PCB vias to the PCB level. FIG. 1 also shows the power supply connections 103 for the integrated circuit, with power/ground planes and power/ground vias through package substrates, power/ground pins, solder balls, PCB vias, and PCB power/ground planes. As depicted in FIG. 1, there are two major processes by which a switching aggressor I/O buffer 104 might affect the noise (e.g., signal or edge delay) on a victim I/O buffer 105. One way is through direct impact of the aggressor magnetic flux 106 on the victim path. This impact happens along the whole victim path including the package and PCB vias and is referred to as mutual inductive coupling. The other way for a switching aggressor I/O buffer 104 to affect the noise on a victim I/O buffer 105 is through the power supply connections 103 (e.g., the PDN). Simultaneously switching aggressors consume significant current. When a consumption current peak occurs, it causes power sags, ground bounces, and power supply resonances, which affect the simultaneously switching noise (SSN) through I/O circuits.

Figure 2A:
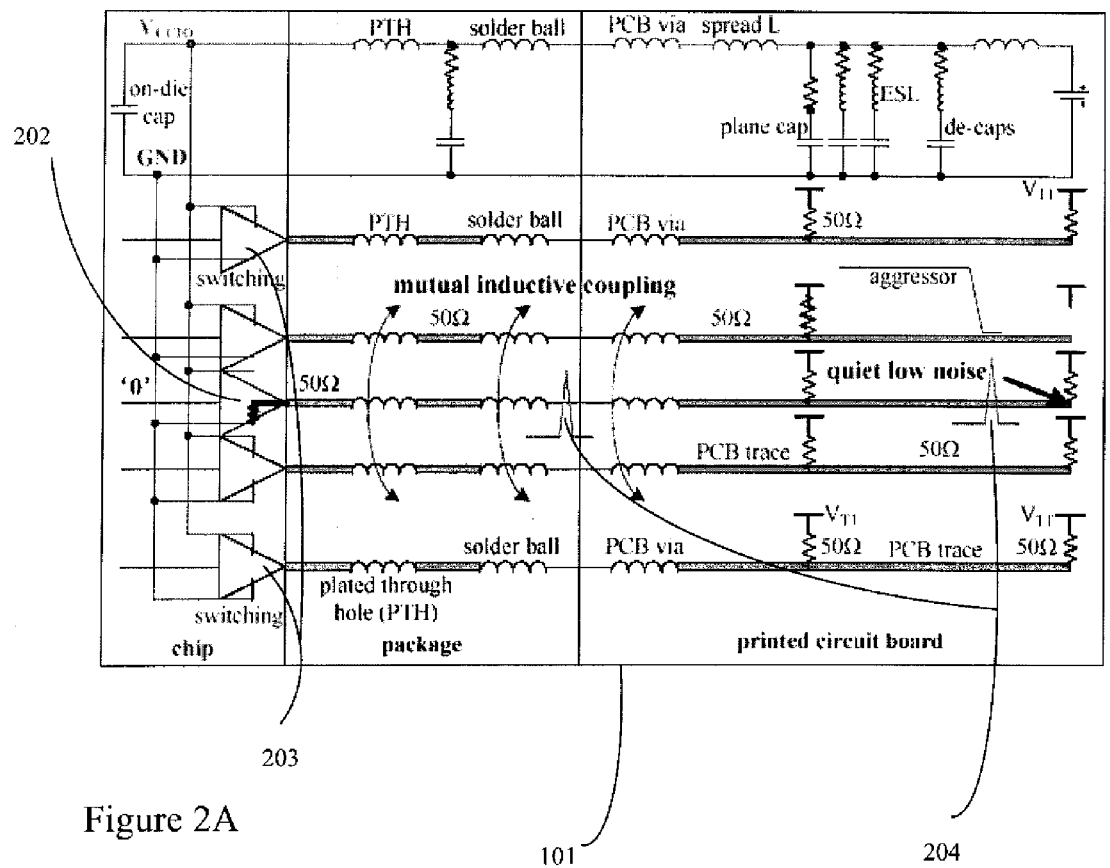
FIG. 2A is a simplified schematic diagram illustrating quiet-low noise caused by mutual inductive coupling, in accordance with an example embodiment.
Figure 2B:
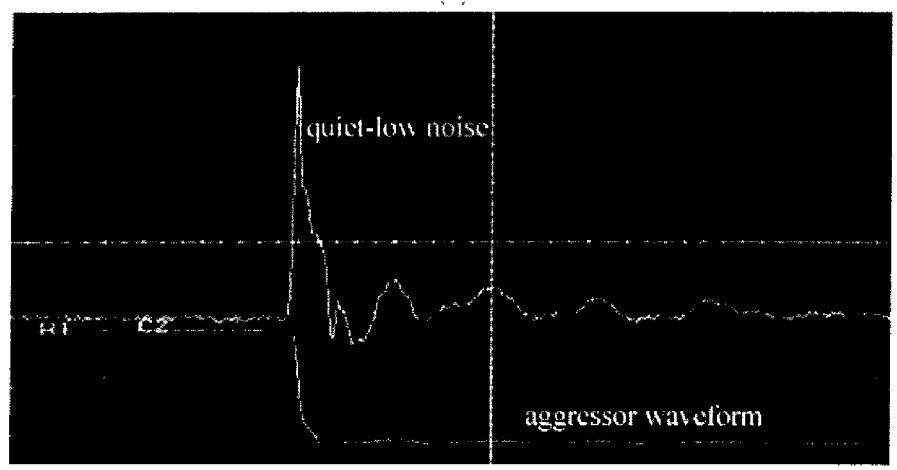
FIG. 2B depicts a waveform resulting from quiet-low noise caused by mutual inductive coupling, in accordance with an example embodiment.

FIG. 2A is a simplified schematic diagram illustrating a scenario for quiet-low noise caused by mutual inductive coupling, in accordance with an example embodiment. In the scenario depicted in FIG. 2A, a quiet I/O buffer 202 (e.g., a victim pin) in a chip-package-PCB 101 is held at logic low (e.g., at '0') and forms a closed loop with its return current path. Similarly, the switching I/O buffers 203 (e.g., the aggressor pins) form closed loops with their return current paths. When the I/O buffers 203 switch simultaneously, the transient currents through the switching buffers create time-varying magnetic fields, which penetrate into the victim loop and induce a voltage noise, depicted as a typical quiet-low noise waveform 204, which is shown in greater detail in FIG. 2B, along with the corresponding aggressor waveform. In the scenario shown in FIG. 2A, mutual inductive coupling is the dominant process for producing SSN.

Figure 3A:
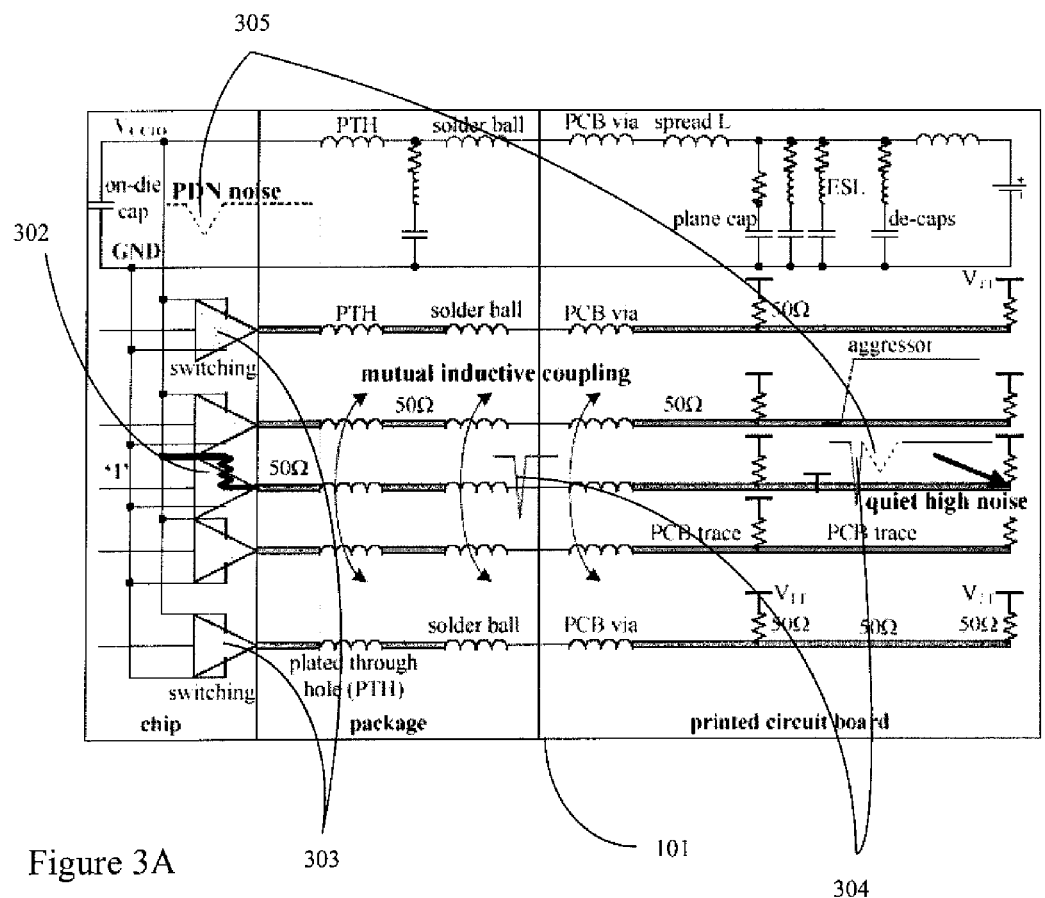
FIG. 3A is a simplified schematic diagram illustrating quiet-high noise caused by mutual inductive coupling and PDN noise, in accordance with an example embodiment.

FIG. 3A is a simplified schematic diagram illustrating quiet-high noise caused by mutual inductive coupling and PDN noise, in accordance with an example embodiment. In the scenario depicted in FIG. 3A, a quiet I/O buffer 302 in a chip-package-PCB 101 is held at logic high (e.g., at '1'), while I/O buffers 303 switch simultaneously. A substantial number of transient currents not only generate magnetic fields coupled to the victim I/O buffer 302, but also cause a drop in delta-I voltage when it flows through the inductive circuit components of the PDN. These inductances are associated with interconnection structures, such as power balls of a ball-grid array (BGA) package and power vias in a PCB.

Figure 3B:
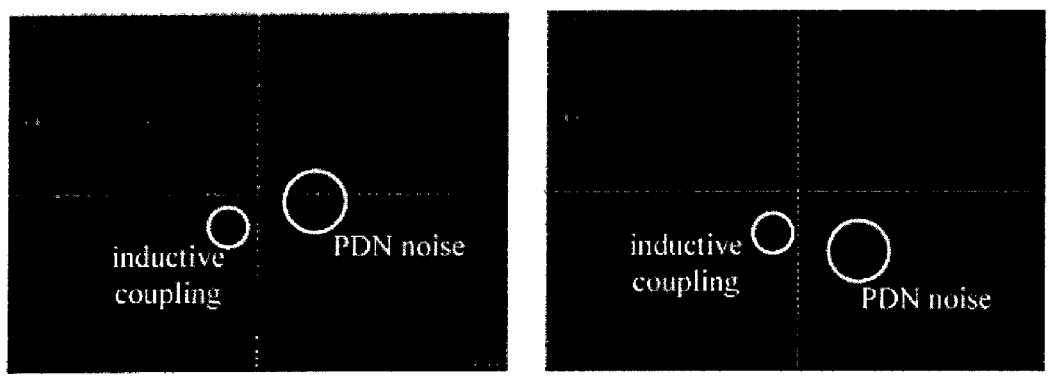
FIG. 3B depicts two waveforms resulting from quiet-high noise caused by mutual inductive coupling and PDN noise, in accordance with an example embodiment.

The contributions from the mutual inductive coupling and the PDN effect are distinct, as shown in FIG. 3A. The sag caused by the mutual inductive coupling 304 has a higher resonant frequency, as compared to the sag due to the PDN effect 305. This characteristic facilitates the decomposition of the two contributions. When only a few aggressors I/O buffers 303 toggle, the mutual inductive coupling usually contributes more than the PDN effect, as shown in the left waveform in FIG. 3B. However, the PDN sag might be worse when more aggressor I/O buffers 303 switch simultaneously, as shown in right waveform in FIG. 3B.

Figure 4:
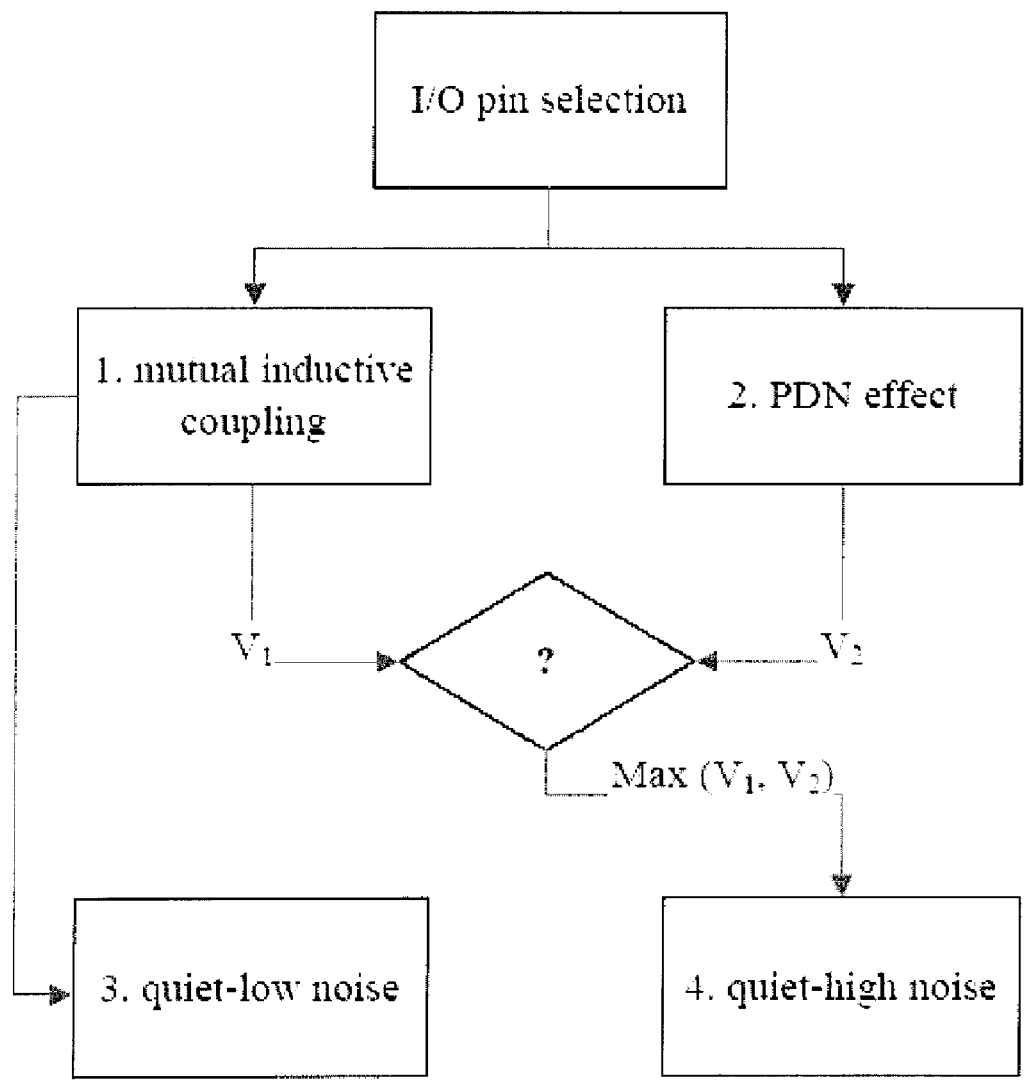
FIG. 4 is a simplified flowchart diagram showing a high-level process for classifying the primary cause of SSN, in accordance with an example embodiment.

FIG. 4 is a simplified flowchart diagram showing a high-level process for classifying the primary cause of SSN, in accordance with an example embodiment. The process is consistent with the waveforms shown in FIGS. 2 and 3. The input for the process is an FPGA I/O pin assignment which specifies an I/O standard, pin count, and pin locations. The output of the process is the glitch amplitude (e.g., amplitude without respect to positive or negative direction) of quiet-low or quiet-high noise. In operation 1 of the process, the system quantifies mutual inductive coupling for both quiet-low and quiet-high scenarios. In operation 2, the system characterizes the PDN noise for only the quiet-high scenario. In operation 3, the system reports the mutual inductive coupling as the quiet-low noise. In operation 4, the system reports the maximum of the glitch amplitudes from operations 1 and 2 as the quiet-high noise.

Figure 5:
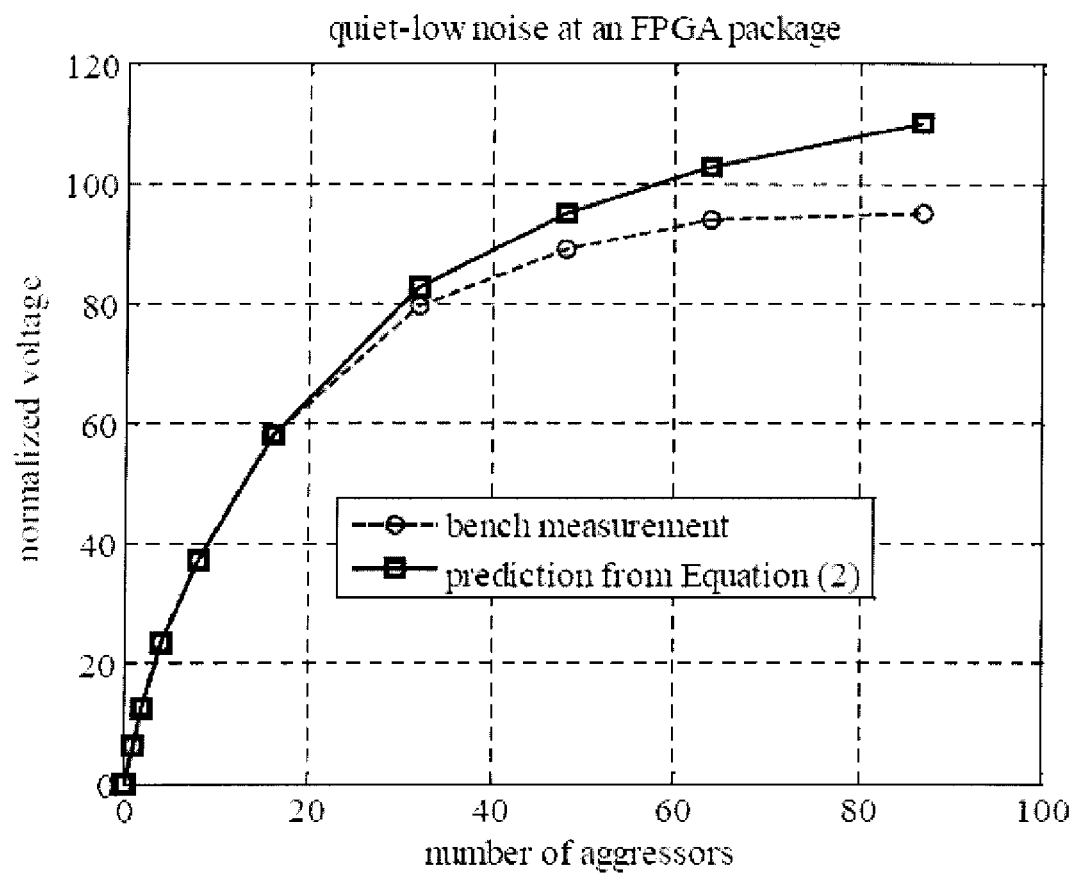
FIG. 5 is a diagram showing a mathematical model for estimating quiet low noise and a plot showing the effect of switching rate degradation on the estimates resulting from the model.

FIG. 5 is a diagram showing a mathematical model for estimating quiet low noise and a plot showing the effect of switching rate degradation on the estimates resulting from the model. In FIG. 5, the mathematical model is described as Equation 2, which is reproduced below:

$$V_i = \sum_{j=1}^{N} M_{ij} \frac{dI_j}{dt}$$

where $M_j$ is the mutual inductance between a quiet (or victim) I/O buffer i and a switching (or aggressor) I/O buffer j in an FPGA package, $I_j$ is the current flowing through switching I/O buffer j, N is the number of switching I/O buffers, and $V_i$ is the induced voltage at the quiet I/O buffer i. As shown by the plot in FIG. 5, this mathematical model results in an overestimation of the quiet-low noise (in terms of normalized voltage) obtained with bench measurements. In an example embodiment, the overestimation results from a failure to account for the switching rate degradation affecting each switching I/O buffer j, when multiple I/O buffers are switching simultaneously.

Figure 6:
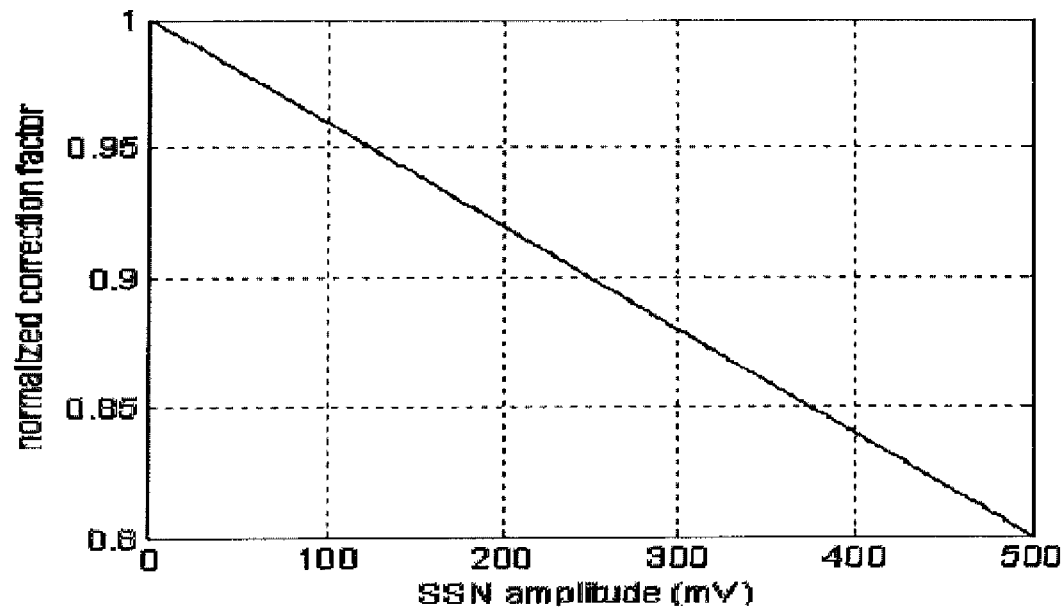
FIG. 6 is a diagram showing a mathematical model for estimating quiet low noise and the plotted empirical measurements used to determine a normalized correction factor used in the model, in accordance with an example embodiment.

FIG. 6 is a diagram showing a mathematical model for estimating quiet low noise and the plotted empirical measurements used to determine a normalized correction factor used in the model, in accordance with an example embodiment. The mathematical model in FIG. 6 is reproduced below:

$$V_i = \sum_{j=1}^{N} M_{ij} \alpha_j \frac{dI_j}{dt}$$

where again $M_{ij}$ is the mutual inductance between a quiet (or victim) I/O buffer i and a switching (or aggressor) I/O buffer j in an FPGA package, $I_j$ is the current flowing through I/O buffer j, N is the number of switching I/O buffers, $V_i$ is the induced voltage at the quiet I/O buffer i. This mathematical model also includes an individual correction factor $\alpha_j$ for switching I/O buffer j, where the correction factor compensates for the switching rate degradation affecting switching I/O buffer j, when multiple I/O buffers are switching. The plot shown in FIG. 6 shows the normalized correction factors (e.g., $\alpha_j$) associated with different values of SSN amplitude (measured in mV). The plot is the result of a sample of bench measurements, which have been normalized. It will be appreciated that if the switching rate of a single aggressor I/O buffer is defined as a reference, the switching rate of multiple aggressor I/O buffers can be normalized using the reference. The normalized values will be less than or equal to 1 since switching rate degradation increases with increases in the number of aggressor I/O buffers. In FIG. 6, the normalized correction factors range from a value of approximately 0.8 to a value of approximately 1. It will further be appreciated that given the SSN amplitude for a particular switching I/O buffer j, the plot can be used to obtain a specific normalized correction factor for that buffer (e.g., $\alpha_j$), as explained in greater detail below.

FIG. 7 is a diagram showing a matrix product for estimating mutual inductive coupling for an FPGA before and after addition of a normalized correction factor, in accordance with an example embodiment. It will be appreciated that the mathematical models shown in FIGS. 5 and 6 result from application of the superposition principle and that these models can also be expressed in terms of matrices. In FIG. 7, matrix product 701 shows a vector 702 of victim pins (or buffers) that results from the matrix multiplication of an N×N matrix of mutual inductive coupling 703 and a vector 704 of aggressor pins. In an example embodiment, N might be the total number of I/O pins (or buffers) in an FPGA. It will be appreciated that the vector 704 of aggressor pins is comprised of values that are merely 0 or 1, which indicate whether an aggressor pin is switching or not. The vector 704 does not account for the switching rate degradation affecting the aggressor pin. Also shown in FIG. 7 is matrix product 705 that includes a vector 706 of victim pins which results from the matrix multiplication of an N×N matrix of mutual inductive coupling 707 and a vector 708 of aggressor pins. Once again, in an example embodiment, N might be the total number of I/O pins (or buffers) on an FPGA. It will be appreciated that the vector 708 of aggressor pins is comprised of values that are not necessarily 0 or 1, e.g., $S_2$, $S_3$, and $S_N$. In a particular example embodiment, these values correspond to the specific normalized correction factors (e.g., $\alpha_j$) described above and depend on the switching rate degradation affecting the aggressor pin.

Figure 8:
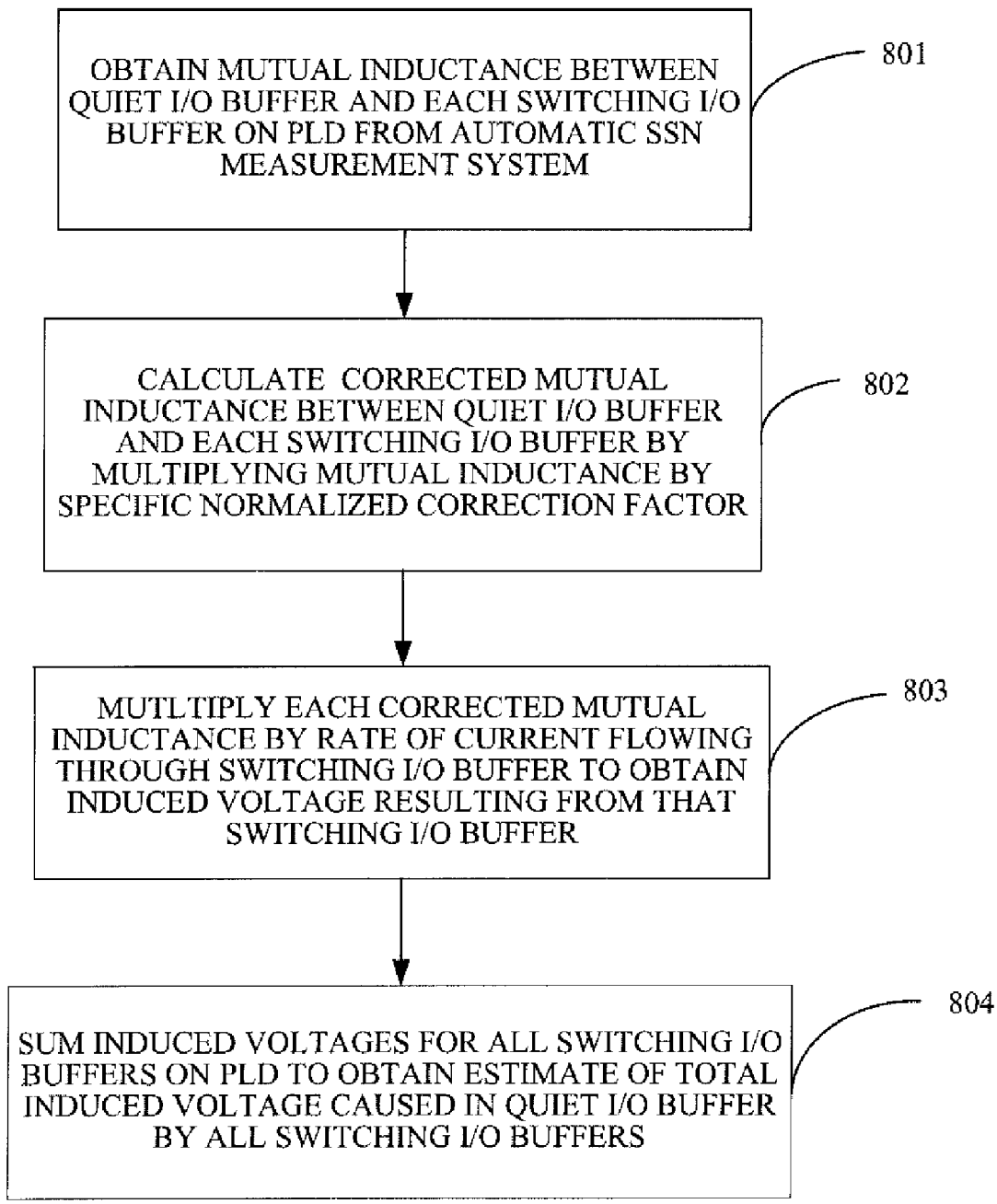
FIG. 8 is a simplified flowchart diagram showing a process for estimating mutual inductive coupling, in accordance with an example embodiment.

FIG. 8 is a simplified flowchart diagram showing a process for estimating mutual inductive coupling, in accordance with an example embodiment. In the flowchart's first operation 801, the system obtains the mutual inductance between a quiet I/O buffer and each switching I/O buffer on a PLD (e.g., an FPGA) from an automatic SSN measurement system. In operation 802, the system calculates the corrected mutual inductance between the quiet I/O buffer and each switching I/O buffer by multiplying the mutual inductance from operation 801 by a normalized correction factor which is specific to the switching I/O buffer. In operation 803, the system multiplies each corrected mutual inductance by the rate of current flowing through the switching I/O buffer to obtain an induced voltage resulting from the switching I/O buffer. Then in operation 804, the system sums the induced voltages for all the switching I/O buffers on the PLD to obtain an estimate of total induced voltage caused in the quiet I/O buffer by all switching I/O buffers.

In operation 802, the system uses a specific normalized correction factor to discount the mutual inductance between the quiet I/O buffer and each switching I/O buffer. In a particular example embodiment, the system might obtain the specific normalized correction factor from the data in the plot shown in FIG. 6 and the data that goes into the mathematical model shown in FIG. 6. For example, the system might use data that goes into the mathematical model (e.g., the values in the mutual inductive coupling matrix, their rate of current, etc.) to calculate an SSN amplitude for the SSN affecting a particular switching I/O buffer (e.g., the SSN resulting from mutual inductive coupling caused by other switching I/O buffers). Then taking this calculated SSN amplitude as an input, the system might determine a specific normalized correction factor associated with the calculated SSN amplitude from the data in the plot.

As suggested by the description of FIG. 8, an automatic SSN measurement system might be used to obtain the mutual inductance between a quiet I/O buffer and a switching I/O buffer and to perform the other operations of the process described in FIG. 8, in an example embodiment. In a particular example embodiment, the automatic SSN measurement system might comprise both a hardware component and a software component. The hardware component might include broadband multiplexers, as explained further below. The software component might include: (1) a NIOS® II embedded soft processor in the FPGA device under test (DUT); (2) a NIOS® II soft processor in a control FPGA; and (3) an integrated characterization environment (ICE) that runs on a PC (personal computer) and that controls the automation system, in one embodiment. It should be appreciated that the soft processors need not be limited to the NIOS® II soft processors, as any suitable soft processor may be incorporated. In a particular example embodiment, the ICE might have three main functions: (a) control all test equipment, such as DC power supplies, a pulse generator, and a high-bandwidth sampling oscilloscope; (b) send defined noise patterns to the NIOS® II soft processor embedded in the DUT; and (c) send defined commands to the NIOS® II soft processor in the control FPGA to configure all multiplexers.

Because the NIOS® II processor is a soft processor, it might employ a customized protocol to communicate with the ICE on the PC. In this protocol, a basic element might be an SSN pattern including the selection of a victim I/O buffer and multiple aggressor I/O buffers. Thus, a pattern or a series of patterns might be conveniently defined by a user at the PC using the ICE. Then the ICE might employ an RS232 series interface to send the patterns to the Nios® II processor in the DUT and corresponding commands to the control FPGA. Upon receipt of the patterns, the NIOS® II processor in the DUT might dynamically program the I/O buffers of the DUT. Upon receipt of the corresponding commands, the NIOS® II processor in the control FPGA might dynamically control the multiplexers so that the SSN waveform at the victim I/O buffer can be captured with the sampling oscilloscope.

Figure 9:
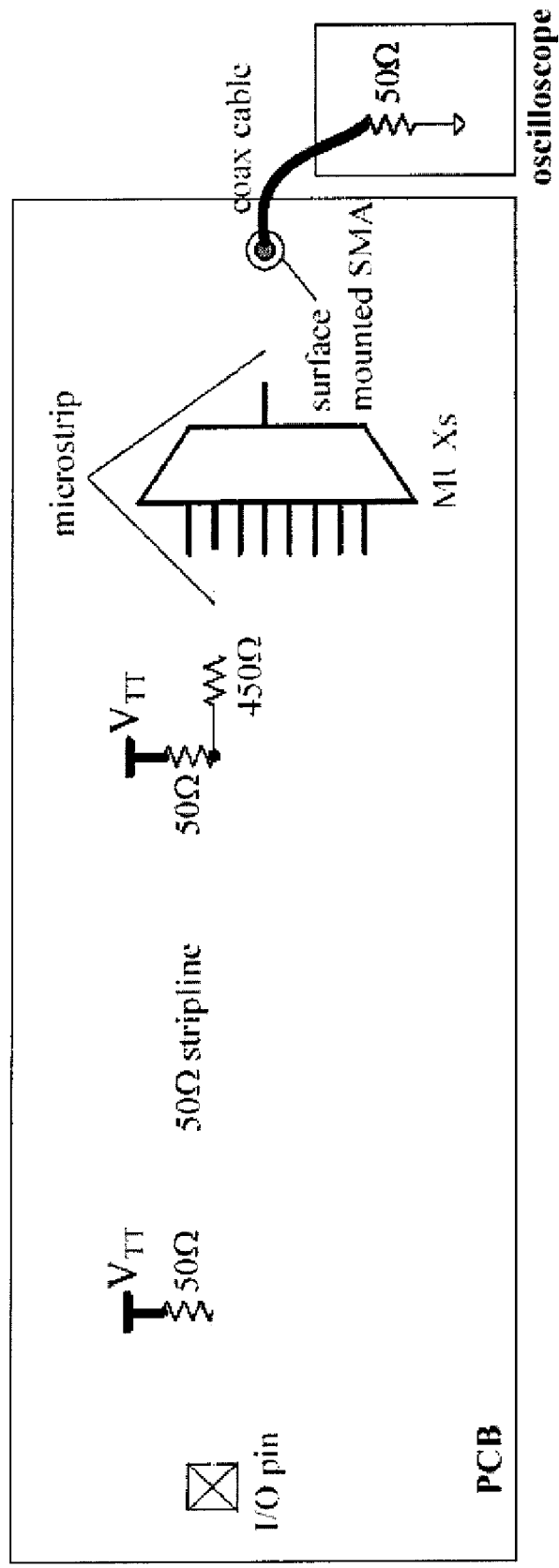
FIG. 9 is simplified schematic diagram of the broadband multiplexers in an automatic SSN measurement system, in accordance with an example embodiment.

As indicated above, the automatic SSN measurement system might employ broadband multiplexers to select a victim I/O buffer from among all FPGA I/O buffers. In an example embodiment, the broadband multiplexers might support up to 800 I/O buffers, with a bandwidth from DC (direct current) to 8 GHz. Also in an example embodiment, a 450Ω resistor might be added between the far-end of each I/O trace and each channel of multiplexers, where the resistor forms a 10:1 probe with a 50Ω oscilloscope termination, as shown in FIG. 9.

Figure 10:
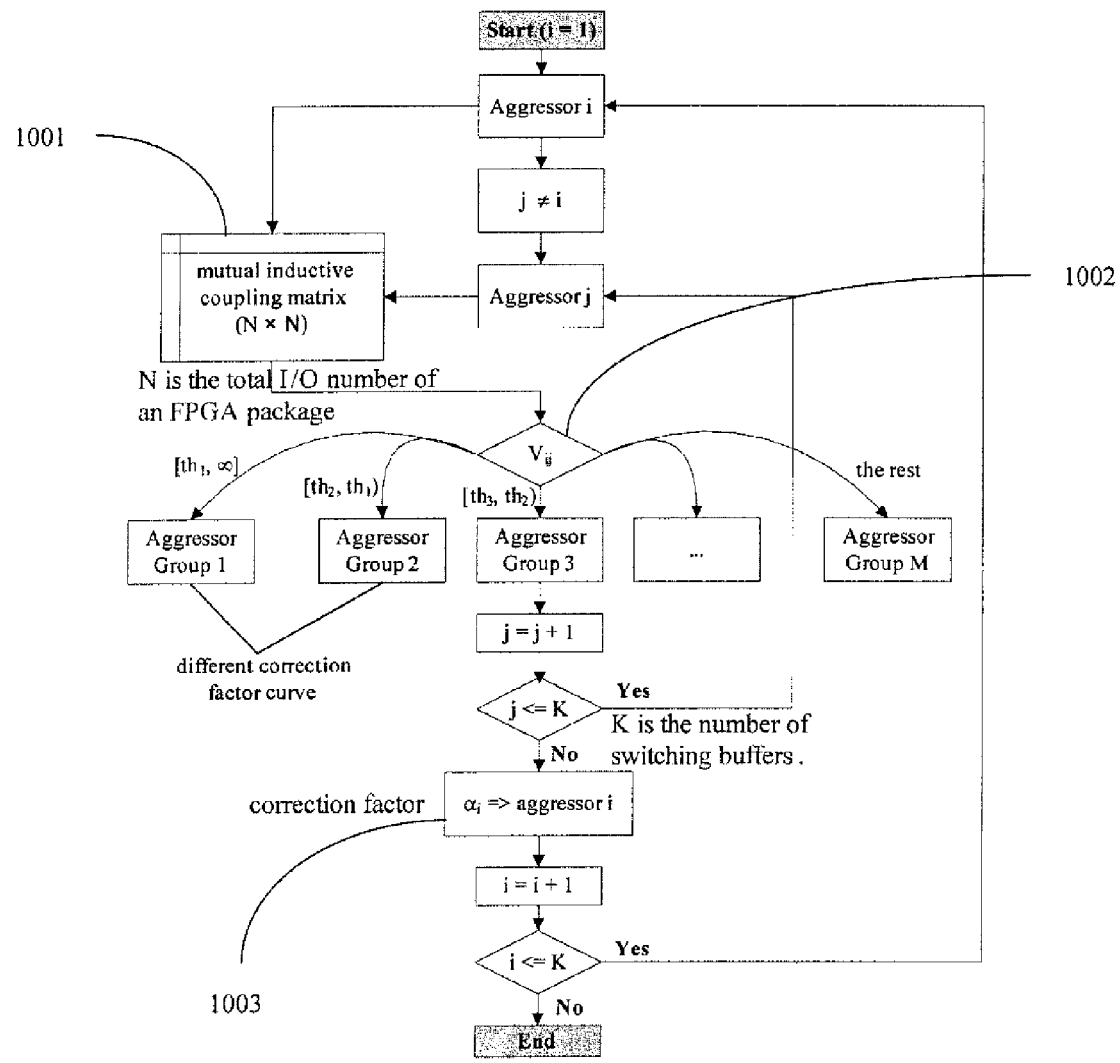
FIG. 10 is simplified flowchart diagram showing a process for determining a normalized correction factor, in accordance with an alternative example embodiment.

FIG. 10 is simplified flowchart diagram showing a process for determining a normalized correction factor, in accordance with an alternative example embodiment. It will be appreciated that the normalized correction factor might be used in the mathematical model shown in FIG. 6. In operation 1001 in FIG. 10, the system obtains the mutual inductive coupling between an arbitrary aggressor I/O buffer i (i∈[1, K]) and another aggressor I/O buffer j (j∈[1, K]) from an N×N mutual inductive coupling matrix, where N is the total number of I/O buffers in an FPGA package and K is the number of switching I/O buffers. In operation 1002, the system uses $V_{ij}$ and threshold values (e.g., $th_1$) to assign the aggressor I/O buffer j to one of M groups that have different normalized correction-factor curves:

Group 1, when $V_{ij}\in[th_1, \infty)$, where $th_1$ is a threshold value;
Group 2, when $V_{ij}\in[th_2, th_1)$;
Group 3, when $V_{ij}\in[th_3, th_2)$;
Group M−1, when $V_{ij}\in th_{M-1}, th_{M-2})$;
Group M, when $V_{ij}\in$ the rest values.

Once all of the other aggressor I/O buffers j have been assigned (e.g., a mutual coupling distribution has been created), the system uses the distribution to determine a normalized correction factor $\alpha_i$ for aggressor I/O buffer i, in operation 1003.

Figure 11:
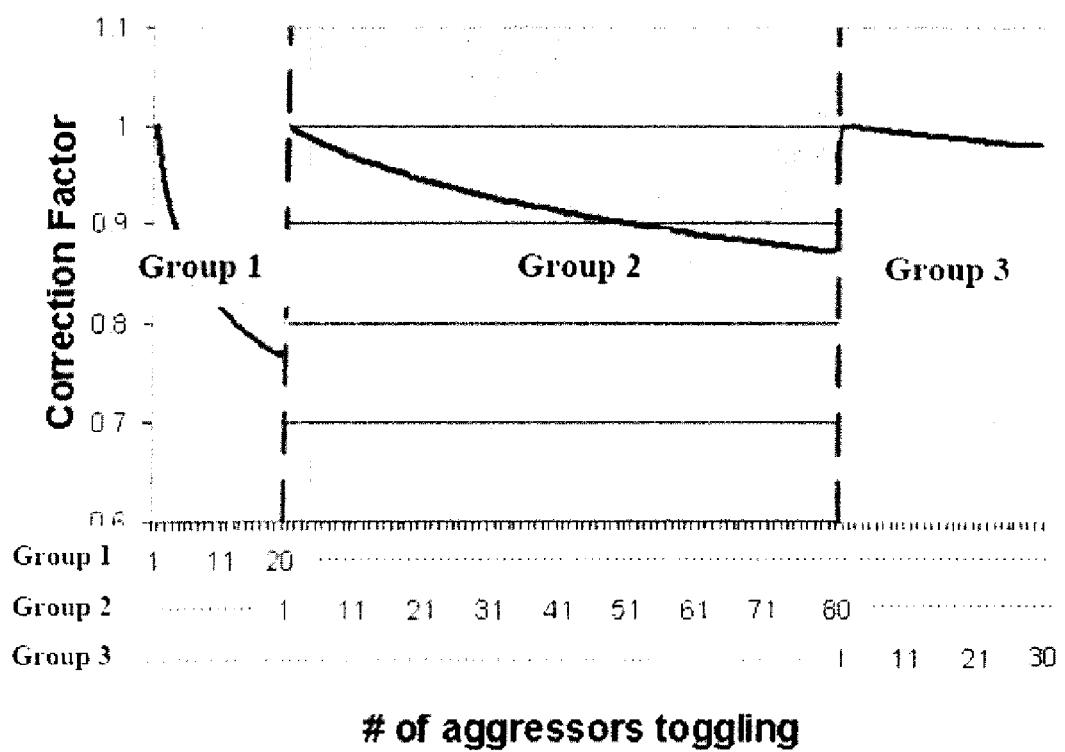
FIG. 11 is a diagram showing a piecewise-continuous function, in accordance with an alternative example embodiment.

FIG. 11 is a diagram depicting a piece-wise curve, according to an alternative example embodiment. In this example embodiment, M is equal to three (e.g., there are three groups to which aggressor buffers j can be assigned on the basis of threshold values). It will be appreciated that the normalized correction-factor curve for each group is continuous and is a function of the number of aggressor I/O buffers (e.g., 1, 11, and 20) in the group. The piece-wise curve in FIG. 11 is discontinuous from one group to another. The curve for each group can be derived from bench measurements and represents an average behavior of aggressor I/O buffers in the group. For instance, aggressor I/O buffers in Group 1 might have a relatively strong mutual inductive coupling with the others in the group, and the normalized correction-factor curve degrades quickly with an increase in the number of aggressor I/O buffers. In contrast, the aggressor I/O buffers in Group 3 might have relatively a weak coupling effect and the normalized correction-factor curve decays slowly.

Consider an example using the flowchart in FIG. 10 and the piece-wise curve in FIG. 11, where $A_T$ is a target aggressor I/O buffer and the other aggressor I/O buffers have been divided into the three groups as follows:

three aggressor I/O buffers ($A_1, A_2, A_3$) in Group 1;
five aggressor I/O buffers ($A_4, A_5, A_6, A_7, A_8$) in Group 2; and
four aggressor I/O buffers ($A_9, A_{10}, A_{11}, A_{12}$) in Group 3.

From the curve for Group 1 in FIG. 11, group correction factor $\beta_1$ is determined on the basis of three aggressor I/O buffers (e.g., $A_1, A_2$, and $A_3$). Similarly, group correction factor $\beta_2$ is determined on the basis of five aggressor I/O buffers (e.g., $A_4, A_5, A_6, A_7$, and $A_8$) and group correction factor $\beta_3$ is determined on the basis of four aggressor I/O buffers (e.g., $A_9, A_{10}, A_{11}$, and $A_{12}$). Combining the three group correction factors, the overall normalized correction factor $\alpha_T$ for $A_T$ might be a function of $\beta_1, \beta_2$, and $\beta_3$: $\alpha_T = \beta_1 \beta_2 \beta_3$, where $\beta_i$ is equal to 1 when there is no aggressor in Group i. In general, prediction accuracy improves with an increase in M, e.g., the number of groups that form the basis of a mutual coupling distribution. However, as M increases so does implementation complexity.

The programmable logic device (PLD) described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

Although the foregoing example embodiments have been described in some detail for purposes of clarity of understanding, it will be apparent that certain changes and modifications may be practiced within the scope of the appended claims. For example, the normalized correction factor might derive from a theoretical calculation rather than empirical measurements. Or the noise to be predicted might be other than SSN or SSO noise. It should also be appreciated that while some of the examples described above mention programmable logic devices, this term is not meant to be limiting as the embodiments may be applied to any integrated circuit. Accordingly, the example embodiments are to be considered as illustrative and not restrictive. And the invention is not to be limited to the details given herein, but may be modified within the scope and equivalents of the appended claims.

What is claimed is:

1. A method, comprising:
calculating a corrected mutual inductance between a quiet Input/Output (I/O) buffer on an integrated circuit and a switching I/O buffer on the integrated circuit, wherein the corrected mutual inductance is a mutual inductance between the quiet I/O buffer and the switching I/O buffer multiplied by a correction factor compensating for switching rate degradation when multiple I/O buffers on the integrated circuit are switching simultaneously;
multiplying the corrected mutual inductance by a rate of current flowing through the switching I/O buffer to obtain an induced voltage caused by the switching I/O buffer; and
summing induced voltages of all switching I/O buffers on the integrated circuit to obtain an estimate of a total induced voltage caused in the quiet I/O buffer by the switching I/O buffers, wherein at least one method operation is executed through a processor.

2. The method of claim 1, wherein the correction factor is specific to the switching I/O buffer.

3. The method of claim 1, wherein the correction factor derives at least in part from bench measurements.

4. The method of claim 1, wherein the correction factor is determined at least in part by an amplitude of a simultaneous switching noise calculated for the switching I/O buffer by summing the mutual inductance between the switching I/O buffer and each other switching I/O buffer in the integrated circuit.

5. The method of claim 4, wherein the integrated circuit is a field programmable gate array.

6. The method of claim 1, wherein the calculation of the corrected mutual inductance further comprises matrix multiplication of a matrix of mutual inductance between each of the I/O buffers on the integrated circuit and a vector of correction factors for the integrated circuit, wherein each of the correction factors is specific to a switching I/O buffer.

7. The method of claim 1, wherein the correction factor is normalized to be less than or equal to one.

8. The method of claim 1, wherein the mutual inductance between the quiet I/O buffer and the switching I/O buffer is provided by an automatic simultaneous switching noise measurement system.

9. The method of claim 1, wherein the total induced voltage represents simultaneous switching output noise.

10. A non-transitory computer-readable media having program instructions, which when executed through a processor cause the processor to:
    calculate a corrected mutual inductance between a quiet Input/Output (I/O) buffer on an integrated circuit and a switching I/O buffer on the integrated circuit, wherein the corrected mutual inductance is a mutual inductance between the quiet I/O buffer and the switching I/O buffer multiplied by a correction factor compensating for switching rate degradation when multiple I/O buffers on the integrated circuit are switching simultaneously;
    multiply the corrected mutual inductance by a rate of current flowing through the switching I/O buffer to obtain an induced voltage caused by the switching I/O buffer; and
    sum induced voltages of all switching I/O buffers on the integrated circuit to obtain an estimate of a total induced voltage caused in the quiet I/O buffer by the switching I/O buffers.

11. The computer readable media of claim 10, wherein the correction factor is specific to the switching I/O buffer.

12. The computer readable media of claim 10, wherein the correction factor derives at least in part from bench measurements.

13. The computer readable media of claim 10, wherein the normalized correction factor is determined at least in part by an amplitude of a simultaneous switching noise calculated for the switching I/O buffer by summing the mutual inductance between the switching I/O buffer and each other switching I/O buffer in the integrated circuit.

14. The computer readable media of claim 13, wherein the integrated circuit is a field programmable gate array.

15. The computer readable media of claim 10, wherein the calculation of the corrected mutual inductance further comprises matrix multiplication of a matrix of mutual inductance between each of the I/O buffers on the integrated circuit and a vector of correction factors for the integrated circuit, wherein each of the correction factors is specific to a switching I/O buffer.

16. The computer readable media of claim 10, wherein the correction factor is normalized to be less than or equal to one.

17. The computer readable media of claim 10, wherein the mutual inductance between the quiet I/O buffer and the switching I/O buffer is provided by an automatic simultaneous switching noise measurement system.

18. The computer readable media of claim 10, wherein the total induced voltage represents simultaneous switching output noise.

* * * * *